United States Patent [19]

Raymond

[11] Patent Number: 4,834,309

[45] Date of Patent: May 30, 1989

[54] PHOTOGRAPHIC-MATERIALS DISPENSER

[76] Inventor: Gary E. Raymond, 905 Belle Meade Island Dr., Miami, Fla. 33138

[21] Appl. No.: 187,251

[22] Filed: Apr. 28, 1988

[51] Int. Cl.$^4$ .................... B65H 35/06; B65H 19/00
[52] U.S. Cl. .................. 242/55.53; 242/71.7; 242/56 R; 225/11; 225/40; 312/39
[58] Field of Search ............... 242/55.2, 55.53, 71.1, 242/71.7, 56 R, 67.1 R; 312/37–39; 225/10, 11, 16, 4, 5, 40, 47, 77; 354/275, 277

[56] References Cited

U.S. PATENT DOCUMENTS

| | | | |
|---|---|---|---|
| 3,167,368 | 7/1965 | Rozlog et al. | 312/39 |
| 3,301,617 | 1/1967 | Goodwin et al. | 242/55.53 X |
| 3,697,146 | 10/1972 | Boisen | 242/55.53 X |
| 3,737,087 | 6/1973 | Rooklyn | 312/38 X |
| 3,826,548 | 7/1974 | Schnyder et al. | 312/38 |
| 4,455,905 | 6/1984 | Raymond | 225/40 X |
| 4,765,555 | 8/1988 | Gambino | 242/55.53 |

FOREIGN PATENT DOCUMENTS 585411 2/1947 United Kingdom .................. 312/39

Primary Examiner—David Werner
Attorney, Agent, or Firm—Bernard J. Murphy

[57] ABSTRACT

The dispenser has a housing in which are rotatably journalled a photographic sheet materials supply shaft, and a pair of nipping rollers. A motor drives one of the rollers through a drive train, and such driven roller drives the other. A leader of sheet material from said shaft, fed to said nipping rollers, is drivenly payed-out from the shaft, and between the rollers, when the motor is turned on. Further, a handwheel journalled in a control box mounted to the housing turns an indicia-graduated dial to an indicated length of sheet material sought to be payed out. A motor switch, in cooperation with control box and housing circuitry, powers the motor to pay-out the dialed length of sheet material, and a further switch which monitors the rotation of the dial turns the motor off when the dialed length of material has been payed-out.

6 Claims, 3 Drawing Sheets

PHOTOGRAPHIC-MATERIALS DISPENSER

This invention pertains to dispensers for sheet materials, and in particular to dispensers for rolled sheet materials, such as negative stock, emulsified paper, and like photographic materials. Exemplary of the dispensers to which the invention pertains is that disclosed in my U.S. Pat. No. 4,455,905, issued on Jan. 26, 1984, for "Dispenser Means for Rolled Sheet Materials". Notwithstanding the novelty of the aforesaid, patented dispenser, there has been an unmet need for an improved dispenser. What has been sought has been a dispenser which is (a) motor-powered, and (b) capable of feeding out only a predetermined length of sheet material.

It is an object of the instant invention to set forth just such a long-sought powered, and selective-length feeding dispenser.

Particularly, it is an object of this invention to set forth a photographic-materials dispenser, comprising a housing having end walls; a shaft journalled in said end walls upon which to mount a roll of photographic material; a drive roller journalled in said end walls; a driven roller journalled in said end walls, in juxtaposition, and mutually nipping engagement, with said drive roller; motor means mounted in said housing; and a power train supported within said housing, drivenly coupled to said drive roller to drive said drive roller in powered rotation, to cause said drive roller to drive said driven roller, whereby, sheet material unrolled from said shaft, and introduced between said rollers, is drivenly payed out from said shaft and between said rollers; wherein said housing has a hinged cover for enclosing and exposing said shaft and rollers; and said walls and said cover have means cooperative for forming a barrier to the admittance of light into said housing.

Further objects of this invention, as well as the novel features thereof, will become more apparent by reference to the following description, taken in conjunction with the accompanying figures, in which.

Figure 1:
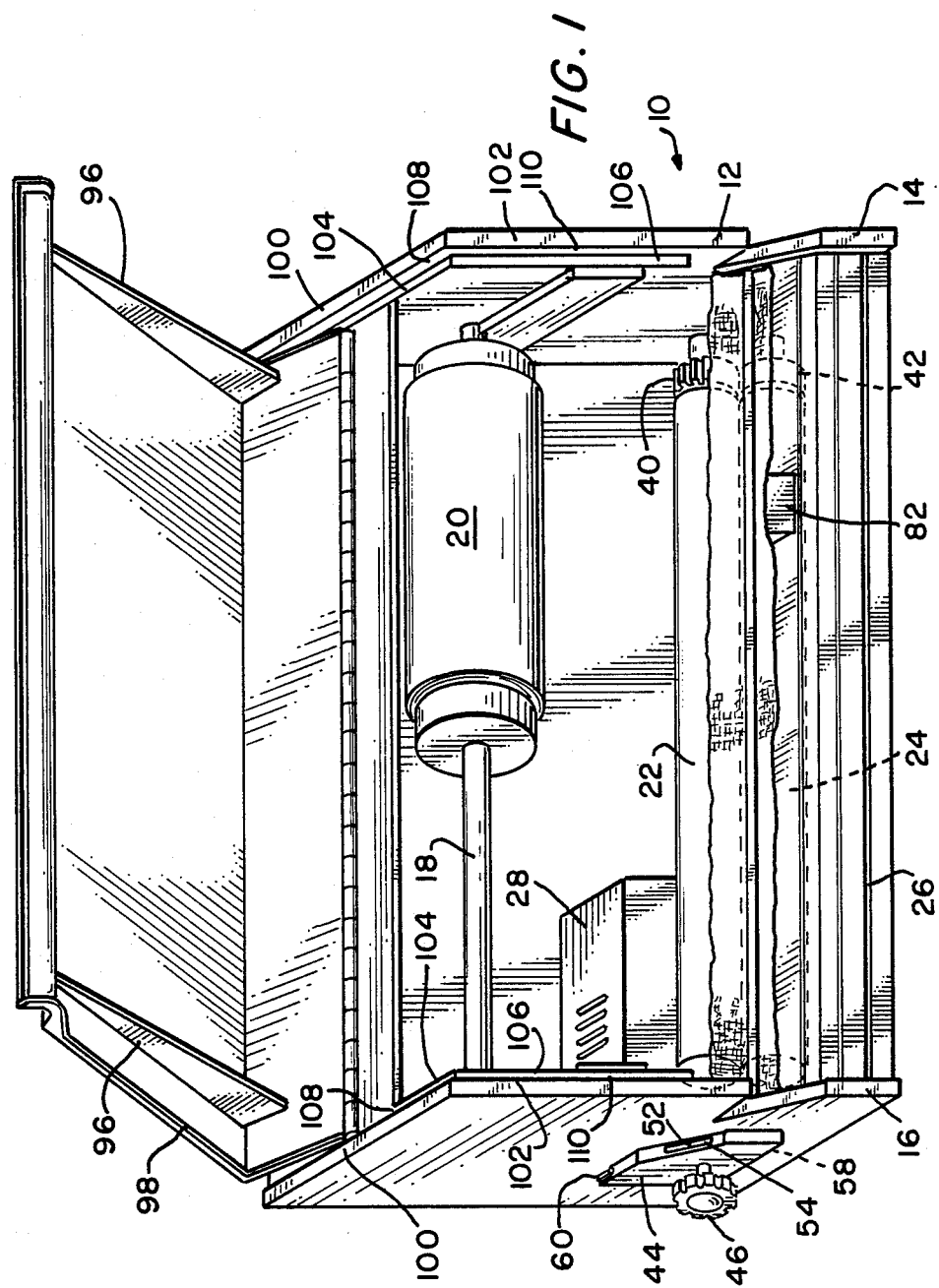
FIG. 1 is an isometric projection of the novel Dispenser, according to an embodiment thereof.
Figure 2:
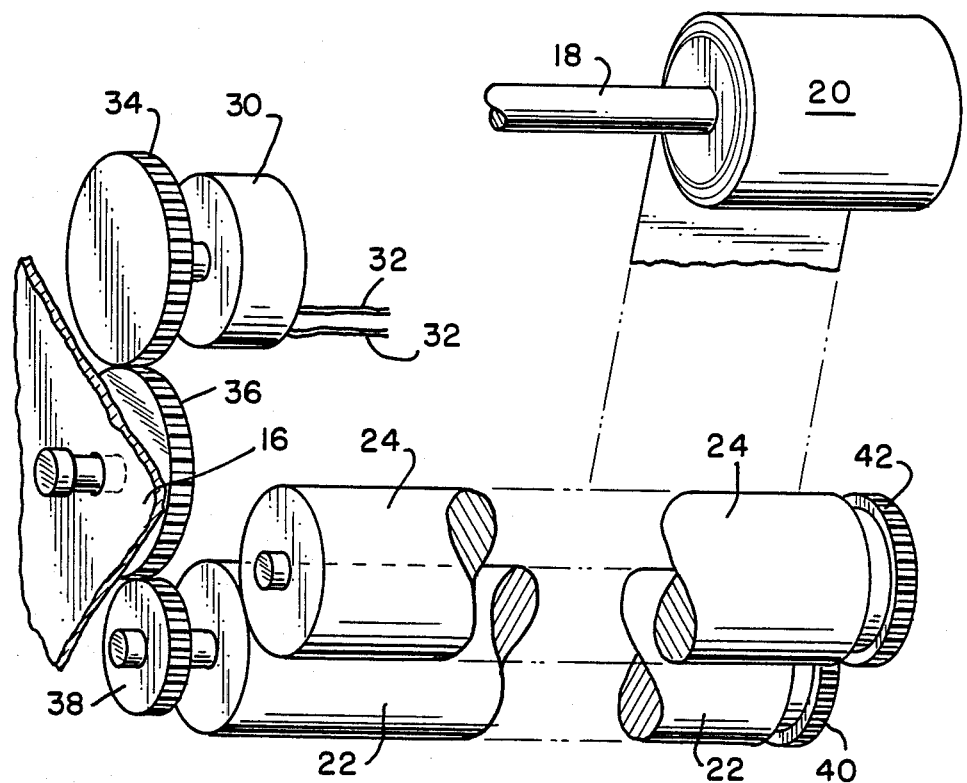
FIG. 2 is a perspective pictorial of the gear train, nipping rollers, motor, and materials roll.
Figure 3:
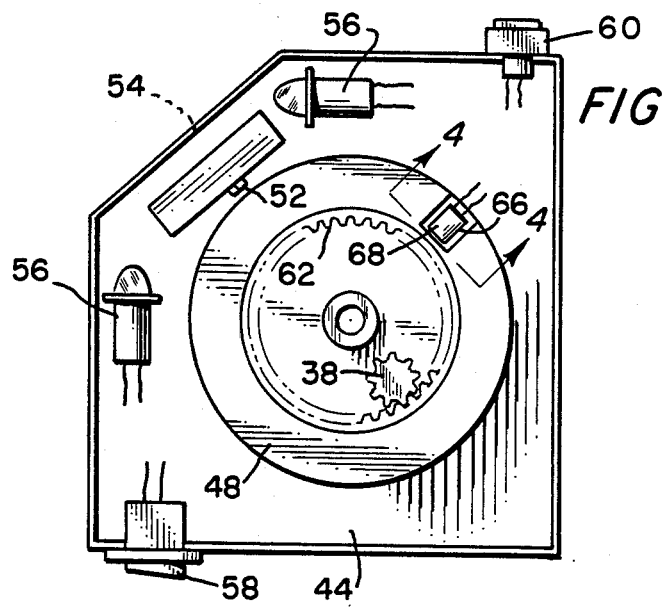
FIG. 3 is a depiction of the control box (with the outermost cover therefor removed)
Figure 4:
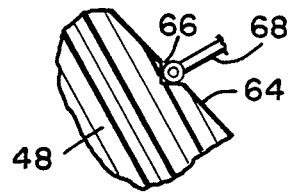
FIG. 4 is a cross-section taken along section 4—4 of FIG. 3.
Figure 5:
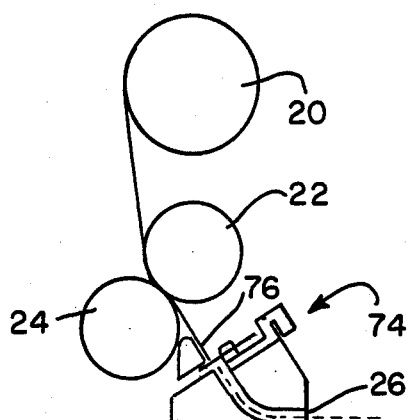
FIG. 5 is a line illustration in which the relationship of the supply roll to the nipping rollers, material pay-out slot, and severing knife is shown.

As shown in the figures, the dispenser 10 comprises a housing 12 having end walls 14 and 16. A shaft 18 receives a roll of photographic material 20 thereon, and is journalled in the end walls 14 and 16. A drive roller 22 is journalled in the end walls 14 and 16, as well as a driven roller 24. The two rollers, nipping rollers, receive a leader of the material 20 therebetween, from the shaft 18, and feed the material through a pay-out sot 26 formed therefor in the front of the dispenser 10.

An enclosure 28, mounted within the housing 12, confines many of the electrical components of the dispenser 10. For instance, such components comprise an electrical motor 30, and electrical lines 32 of the circuitry. The motor 30 has a powered shaft which mounts a drive gear 34. Gear 34 is meshed with, and drives, an idler gear 36 which is journalled in wall 16 of the housing 12. In turn, gear 36 is meshed with, and drives a pinion gear 38 which is coupled to one end of roller 22. A drive gear 40 is coupled to the opposite end of roller 22, and it is meshed with, and drives, another gear 42 mounted to the juxtaposed end of roller 24.

To wall 16 is mounted a control box 44. A handwheel 46, disposed externally of the control box, is fastened to a dial 48 which is confined within the box. On the outer circumferential surface 50 of the dial are indicia; the latter signify lengths of material 20 (in inches). As will be explained, the dial is used to predetermine how much material 20 will be dispensed by the dispenser 10. An indicator 52 is set across the indicia-surface of the dial 48, and shows through a clear window 54 set in the control box 44. The control box 44 mounts lamps 56 provided to illuminate the window 54 and the indicia on the dial 48, a dispenser on/off switch 58, and a motor on/off switch 60; the operational function of such switches is explained in the ensuing text.

Dial 48 comprises a ring gear 62, and it is in meshed engagement with the pinion gear 38 carried by roller 22. The dial 48 has an annular face 64 which is flat fully thereabout, except for one location thereon where there obtains a recess 66. A follower 68, projecting from a stop switch 70, is engaged with, and trackingly "follows" the face 64. Switch 70 is normally open and, when the follower engages the recess, assumes its open disposition. However, when the dial 48 is rotated, to displace the follower 68, the switch 70 is put in its closed disposition.

The pinion gear 38 and drive roller 22 have a slip coupling therebetween, so that the gear 38 can be rotated by the handwheel 46 (through the dial 48 and ring gear 62), without rotating the roller 22, yet rotation of the roller 22 (by the motor 30 and the gear train) will cause rotation of the ring gear 62, dial 48 and handwheel 46. To dispense a selected length of material 20, the operation is as follows. The line plug 72 is connected with a power source. The lamp switch 58 is turned on to illuminate the lamps 56. The handwheel 46 is turned to rotate the dial 48 to a selected material-length dispensing. Then the motor switch 60 is depressed to power the motor 30. The dial 48 will indicate the selected length (for instance "18" inches) and, as a consequence of having been rotated will have caused the follower 68 to close the switch 70. The motor 30 will turn the gears 34, 36 and 38, causing rotation of roller 22. Roller 22, via gears 40 and 42, causes rotation of roller 24, and the material 30 is payed out through the slot 26—until the dial is rotated back to its "zero" position. When the dial 48 returns to its "zero" position, the follower 68 drops back into the recess 66, and cuts off power to the motor 30. Thus the "dialed" length of material has been properly payed-out. It remains, however, to sever the payed-out material. The dispenser has a cutter 74 provided for this purpose.

Within the housing 12, and extending thereacross, is a land 76 upon which the dispensed material 30 is payed-out. Adjacent to the land 76, and parallel therewith, is a ridge 78. A plastic-strip depressor 80 is suspended slightly above the land 76 to hold the material while the cutter 74 severs the payed-out length of material 30. The cutter 74 has an external handle 82, a U-shaped bracket 84, and a plate 86 extending normal therefrom. Plate 86 mounts a blade 88 and an O-ring enwrapped wheel 90. The bracket 84 slidably engages, and traverses the ridge 78 and, as it does so, it causes the depressor 80 to clasp the material which rests upon the land 76, while the blade 88 severs the material 30.

Obviously, if the cutter 74 happened to be intruding the pay-out area of the land 76 when the dispenser 10 payed-out material, it would cause a blockage and crumbling and clear ruin of the material. Accordingly, the invention comprehends means to insure that the material can not be payed-out unless and until the cutter 74 is placed at one end or the other of the ridge 78. It is to this end that the further switches 92 and 92a are provided.

Figure 8:
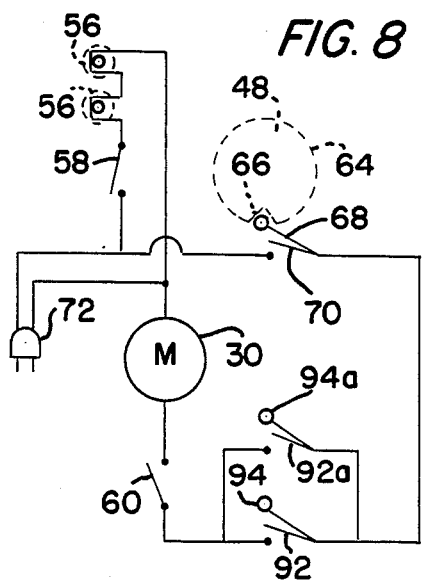
FIG. 8 is a schematic diagram of the electrical circuitry of the dispenser.
Figure 6:
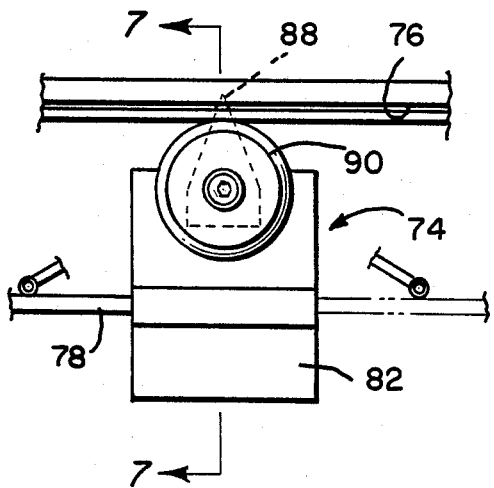
FIG. 6 is a top view of the severing knife and the housing-confined ridge along which it traverses, and further depicts the followers of the control switches disposed at ends of the ridge.
Figure 7:
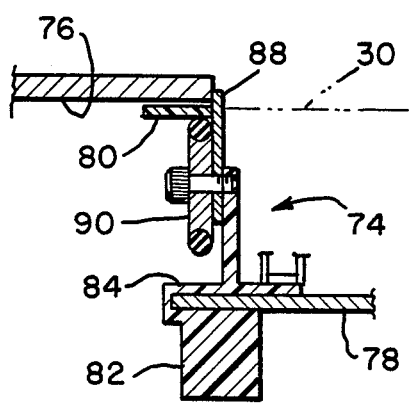
FIG. 7 is a cross-sectional view taken along section 7—7 of FIG. 6.

Switches 92 and 92a also have followers 94 and 94a, respectively, coupled thereto. the switches are disposed in proximate adjacency to the ridge 78—one at each end thereof. As can be seen in FIG. 8, the two are coupled in parallel, so that one thereof must be closed in order to power the entire circuitry. The switches 92 and 92a are normally open, but as the cutter 74 traverses the ridge 78, in either direction, the bracket 84 thereof engages one of the followers 94 (or 94a) and displaces it; this causes the switch to close. Then, the circuit is completed, and the dispenser can be operated to pay out material 30.

While I have described my invention in connection with a specific embodiment thereof, it is to be clearly understood that this is done only by way of example, and not as a limitation to the scope of my invention, as set forth in the objects thereof, and in the appended claims. Too, the invention has further features of innovative merit. By way of example, the housing 12 is made light-tight. As can be seen in FIG. 1, it has a hinged cover 96 which has blade-like projections 98 (only those on the left-hand side are visible). The walls 14 and 16 each have a top rim 100 and a vertical rim 102, as well as recessed shoulders 104 and 106 adjacent to the rims. Grooves 108 and 110 are formed between the rims 100 and 102 and the shoulders 104 and 106 so that, as the cover is closed, the projections 98 enter the grooves 108 and 110 to form a light-tight barrier. Additionally, a strip of black-velvet material 112, having an axially-extended reinforcement, sets in a housing recess provided therefor. The material 112 blankets the rollers area, and when the cover closes, it closes upon the upper half of the material. The handle 82 of the cutter 74 just protrudes from under the black-velvet material 112, but is free to traverse without displacing the material.

All such features of this novel dispenser 10 are deemed to be within the ambit of my invention and embraced by the objects and claims thereof.

I claim:

1. A photographic-materials dispenser, comprising:
a housing having end walls;
a shaft rotatably journalled in said end walls upon which to mount a roll of photographic material;
a drive roller journalled in said end walls;
a driven roller journalled in said end walls, in juxtaposition, and mutually nipping engagement, with said drive roller;
motor means mounted in said housing; and
a power train supported within said housing, drivenly coupled to said drive roller to drive said drive roller in powered rotation, to cause said drive roller to drive said driven roller, whereby, sheet material unrolled from said shaft, and introduced between said rollers, is drivenly payed out from said shaft and between said rollers; wherein
said housing further has a hinged cover for enclosing and exposing said shaft and rollers;
said walls and said cover have means cooperative for forming a barrier to the admittance of light into said housing;
said walls each (a) a substantially horizontal top rim and a substantially vertical, front rim, (b) recessed shoulders adjacent to said rims, upon which, and against which, to receive said cover, and (c) grooves formed between said shoulders and said rims;
said cover has continuous, blade-like projections which, upon said cover being hingedly received upon and against said shoulders, enter into said grooves to form the aforesaid light barrier;
said motor means comprises (a) an electrical motor, (b) electrical lines coupled to said motor at one end, and having a line plug at the opposite end, and (c) electrical switching means, intermediate the ends of one of said lines, operative for inhibiting, and for permitting, electrical power communication with said motor;
said housing further has a front wall, and a slot formed therein for accommodating a pay-out of sheet material therethrough;
said housing also has a land formed therewithin, adjacent to said slot, upon which sheet material slides during pay-out thereof;
said housing further has a ridge formed therein, extending lengthwise between said end walls, in adjacency to said land; and further including
means slidably engaged with said ridge for traverse therealong, and having means for severing sheet material; wherein
said switching means comprises normally-open, power-interrupting, control switches, electrically interposed in one of said lines, and physically disposed in adjacency to and at opposite ends of said ridge, said control switches each having a switch-closing, pivotable follower extending therefrom; and
said severing means has means engageable with said followers, upon slidable traverse thereof, along said ridge, to one of said opposite ends of said ridge, for pivotably displacing said follower, at said one end, to close such associated control switch thereat.

2. A photographic-materials dispenser, comprising:
a housing having end walls;
a shaft rotatably journalled in said end walls upon which to mount a roll of photographic material;
a drive roller journalled in said end walls;
a driven roller journalled in said end walls, in juxtaposition, and mutually nipping engagement, with said drive roller;
motor means mounted in said housing; and
a power train supported within said housing, drivenly coupled to said drive roller to drive said drive roller in powered rotation, to cause said drive roller to drive said driven roller, whereby, sheet material unrolled from said shaft, and introduced between said rollers, is drivenly payed out from said shaft and between said rollers; wherein said housing further has a hinged cover for enclosing and exposing said shaft and rollers;
said walls and said cover have means cooperative for forming a barrier to the admittance of light into said housing;
said walls each have (a) a substantially horizontal top rim and a substantially vertical, front rim, (b) recessed shoulders adjacent to said rims, upon which, and against which, to receive said cover, and (c) grooves formed between said shoulders and said rims;
said cover has continuous, blade-like projections which, upon said cover being hingedly received upon and against said shoulders, enter into said grooves to form the aforesaid light barrier;
said motor means comprises (a) an electrical motor, (b) electrical lines coupled to said motor at one end, and having a line plug at the opposite end, and (c) electrical switching means, intermediate the ends of one of said lines, operative for inhibiting, and for permitting, electrical power communication with said motor;
said housing further has a control box externally mounted to one of said side walls; and
said switching means comprises an on/off switch mounted to said control box; further including
a dial rotatably mounted in said control box; and
a handwheel, removably fixed to said dial, externally of said control box, for rotating said dial; wherein;
said dial has a ring gear formed therewithin;
said power train comprises a pinion gear coupled to one end of said drive roller and in meshed engagement with said ring gear;
said dial has an annular face with a recess formed therein at a given location; and
said switching means further comprises a normally-open, power interrupting, stop switch, electrically interposed in one of said lines, and physically mounted in said control box in adjacency to said annular face, and having a switch-closing, pivotable follower extended therefrom trackingly engaged with said face.

3. A photographic-materials dispenser, according to claim 2, wherein:
said dial has graduated indicia on the periphery thereof.

4. A photographic-materials dispenser, according to claim 2, wherein:
said pinion gear and said drive roller have means defining a slip coupling therebetween to accommodate rotation of said pinion gear by said handwheel, through said dial and said ring gear, independent of said drive roller, and means defining a drive coupling therebetween to cause rotation of said dial and said handwheel coincident with a powered rotation of said drive roller.

5. A photographic-materials dispenser, comprising:
a housing having end walls;
a shaft rotatably journalled in said end walls upon which to mount a roll of photographic material;
a drive roller journalled in said end walls;
a driven roller journalled in said end walls, in juxtaposition, and mutually nipping engagement, with said drive roller;
motor means mounted in said housing; and
a power train supported within said housing, drivenly coupled to said drive roller to drive said drive roller in powered rotation, to cause said drive roller to drive said driven roller, whereby, sheet material unrolled from said shaft, and introduced between said rollers, is drivenly payed out from said shaft and between said rollers; wherein
said housing further has a hinged cover for enclosing and exposing said shaft and rollers;
said walls and said cover have means cooperative for forming a barrier to the admittance of light into said housing;
said motor means comprises (a) an electrical motor, (b) electrical lines coupled to said motor at one end, and having a line plug at the opposite end, and (c) electrical switching means, intermediate the ends of one of said lines, operative for inhibiting, and for permitting, electrical power communication with said motor;
said housing further has a front wall, and a slot formed therein for accommodating a pay-out of sheet material therethrough;
said housing also has a land formed therewithin, adjacent to said slot, upon which sheet material slides during pay-out thereof;
said housing further has a ridge formed therein, extending lengthwise between said end walls, in adjacency to said land; and further including
means slidably engaged with said ridge for traverse therealong, and having means for severing sheet material; wherein
said switching means comprises normally-open, power-interrupting, control switches, electrically interposed in one of said lines, and physically disposed in adjacency to and at opposite ends of said ridge, said control switches each having a switch-closing, pivotable follower extending therefrom; and
said severing means has means engageable with said followers, upon slidable traverse thereof, along said ridge, to one of said opposite ends of said ridge, for pivotably displacing said follower, at said one end, to close such associated control switch thereat.

6. A photographic-materials dispenser, comprising:
a housing having end walls;
a shaft rotatably journalled in said end walls upon which to mount a roll of photographic material;
a drive roller journalled in said end walls;
a driven roller journalled in said end walls, in juxtaposition, and mutually nipping engagement, with said drive roller;
motor means mounted in said housing; and
a power train supported within said housing, drivenly coupled to said drive roller to drive said drive roller in powered rotation, to cause said drive roller to drive said driven roller, whereby, sheet material unrolled from said shaft, and introduced between said rollers, is drivenly payed out from said shaft and between said rollers; wherein
said housing further has a hinged cover for enclosing and exposing said shaft and rollers;
said walls and said cover have means cooperative for forming a barrier to the admittance of light into said housing;
said motor means comprises (a) an electrical motor, (b) electrical lines coupled to said motor at one end, and having a line plug at the opposite end, and (c) electrical switching means, intermediate the ends of one of said lines, operative for inhibiting, and for permitting, electrical power communication with said motor;

said housing further has a control box externally mounted to one of said side walls; and said switching means comprises an on/off switch mounted to said control box; and further including a dial rotatably mounted in said control box; and a handwheel, removably fixed to said dial, externally of said control box, for rotating said dial; wherein said dial has a ring gear formed therewithin;

said power train comprises a pinion gear coupled to one end of said drive roller and in meshed engagement with said ring gear;

said dial has an annular face with a recess formed therein at a given location; and said switching means further comprises a normally-open, power-interrupting, stop switch, electrically interposed in one of said lines, and physically mounted in said control box in adjacency to said annular face, and having a switch-closing, pivotable follower extended therefrom trackingly engaged with said face.

* * * * *